Figure 1:
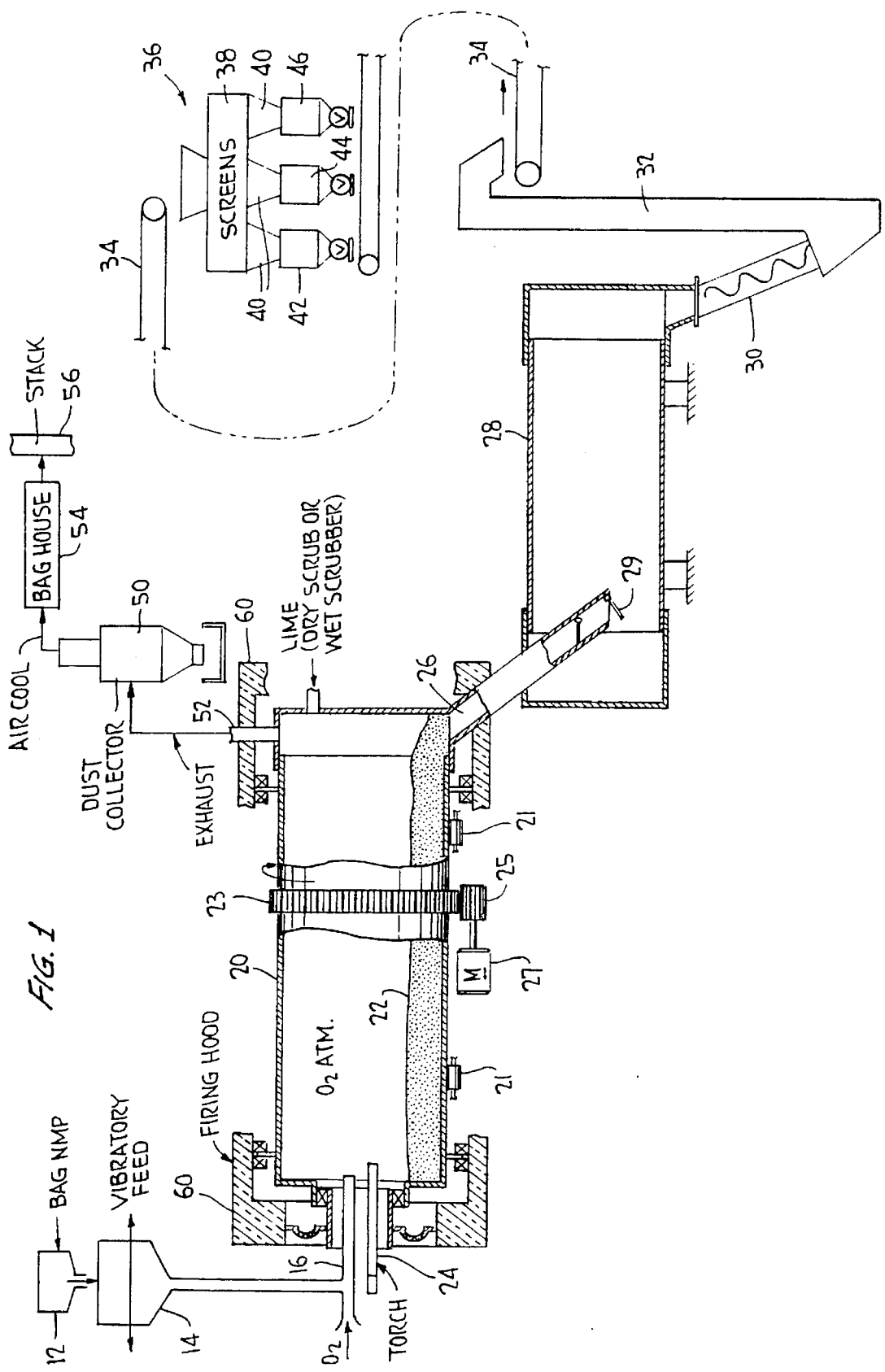

United States Patent [19]

Lindsay

[11] Patent Number: 5,613,996

[45] Date of Patent: *Mar. 25, 1997

[54] PROCESS FOR TREATMENT OF REACTIVE FINES

[75] Inventor: Richard D. Lindsay, Brentwood, Tenn.

[73] Assignee: Plasma Processing Corporation, Brentwood, Tenn.

[*] Notice: The term of this patent shall not extend beyond the expiration date of Pat. No. 5,447,548.

[21] Appl. No.: 436,618

[22] Filed: May 8, 1995

[51] Int. Cl.$^6$ .............................. C22B 4/02; C04B 35/02
[52] U.S. Cl. .................... 75/10.21; 75/672; 423/111; 501/98; 501/155
[58] Field of Search .................... 75/672, 10.21; 423/111; 501/98, 155

[56] References Cited

U.S. PATENT DOCUMENTS 5,308,375  5/1994  Lindsay ...................... 75/672
5,447,548  9/1995  Lindsay ...................... 75/672

Primary Examiner—Melvyn Andrews
Attorney, Agent, or Firm—Breiner & Breiner

[57] ABSTRACT

A process for treatment of aluminum dross residue (NMP) having available aluminum nitride (AlN) and/or free aluminum (Al) and/or aluminum chlorides (AlCl$_3$) having a particle size within the range of 0.3 to 300 microns, i.e., "fines" to produce a high alumina lightweight aggregate is described. The process is characterized in that the NMP is fed into a rotating sealed kiln and heated to a temperature in the range of 2000° to 4000° F. while feeding oxygen or a mixture of oxygen and water into the kiln with less than about 20% of the total heat energy input for heating the NMP to a temperature between 2000° and 4000° F. being supplied from an external source. The process does not require prior agglomerization of the fines.

10 Claims, 2 Drawing Sheets

PROCESS FOR TREATMENT OF REACTIVE FINES

FIELD OF INVENTION

This invention relates to a process for treatment of aluminum dross residue (NMP) having available aluminum nitride (AlN) and/or free aluminum (Al) and/or aluminum chlorides (AlCl$_3$) having a particle size within the range of 0.3 to 300 microns to produce a high alumina lightweight aggregate. The process is characterized in that the NMP is fed into a rotating sealed kiln and heated to a temperature in the range of 2000° to 4000° F. while feeding oxygen or a mixture of oxygen and water into the kiln with less than about 50% of the total heat energy input for heating the NMP to a temperature between 2000° and 4000° F. being supplied from an external source.

BACKGROUND OF INVENTION

When a body of aluminum is melted in a furnace for purposes of recovering aluminum from ore or the like, dross forms on the surface of the molten aluminum and must be periodically removed, for example by skimming or similar operation. The removed dross generally contains substantial amounts of free aluminum as well as aluminum oxides and certain other metals and metal salts of magnesium, manganese, and lithium, depending on the nature of the aluminum or aluminum alloy being treated. It is desirable to recover from the aluminum dross to the extent possible the free aluminum since this free aluminum comprises substantial economic value.

In one conventional way of treating the dross to recover free aluminum, a salt such as sodium chloride is used to blanket the molten dross. The free aluminum is then separated from the dross, providing free aluminum and a non-metallic product containing aluminum oxides and other materials such as aluminum nitrides, aluminum chlorides and aluminum carbides, as well as substantial amounts of salt. The entire non-metallic materials recovered from the dross treatment are referred to herein as non-metallic products (NMPs). These non-metallic products, to a substantial part using the conventional salt treatment, are considered waste materials and conventionally are disposed of in landfills. However, these non-metallic products, since they contain salt and aluminum nitrides (AlN), cannot be disposed of in conventional landfills without treatment since the salt can be leached out during rainfall and the aluminum nitrides are reactive when in contact with moisture, producing ammonium. As a result of this reactivity and ecological considerations, it has been necessary before carrying the NMPs to landfills to remove the salt and aluminum nitrides from the NMPs recovered from salt cake. This has been conventionally done utilizing a desalinization plant wherein the NMPs from salt cake are exhaustively washed and treated to remove salt and the aluminum nitrides to as low a level as possible, preferably below less than one percent. The treatment is costly, and additionally landfills are becoming scarce.

It has been found according to an invention described in application Ser. No. 07/902,025 filed Jun. 22, 1992 that it is advantageous not to treat the NMPs from salt cake so as to remove the aluminum nitrides. Rather, it has been found that non-metallic products containing aluminum nitrides (AlN) can be milled and screened and then advantageously utilized to produce useful refractory, abrasive and the like articles. The AlN within the non-metallic product are reactive in processes converting the non-metallic product into useful refractories and the like articles to provide heat energy useful in forming the desired refractories and the like articles. The aforesaid invention, therefore, not only eliminates the need for the economically disadvantageous exhaustive desalinization treatment of the dross but also provides a useful source of raw material, eliminating the need to put the material into a landfill.

The aforesaid invention, therefore, provides a process wherein a desalinization facility is associated with a dross treatment operation, designed and constructed to wash or mill salt cake whereby the salt levels are reduced by such operations to about 3% or less but where the AlN levels are preserved as much as possible, preferably above about 7% and more preferably in the 12%–24% range. The NMP so treated will also contain free aluminum.

In operations which do not use salt in the treatment of the ore, salt-free dross or "white dross" is recovered. White dross containing high levels of aluminum nitride can be treated directly in a plasma energy furnace as disclosed in U.S. Pat. No. 4,877,448, 4,997,476 and 5,030,273 to recover free aluminum and valuable non-metallic products containing reactive aluminum nitride with the AlN levels being in the range of 7–24% and free aluminum being in the range of 3–7%.

The refractory NMPs having high levels of free aluminum and AlN have application in providing useful refractory materials. For example, U.S. Pat. No. 5,132,246 describes a process for producing a refractory product from NMPs containing aluminum nitride without prior conversion of the aluminum nitride in the residue to aluminum oxide or aluminum hydroxide by mixing the NMPs with a material selected from the group consisting of magnesium oxide, silicon oxide, calcium oxide, nickel oxide, titanium oxide and precursors thereof and then heating the resultant mixture at a temperature in the range of about 1000° to 2300° C. to produce a refractory product. The aforesaid '246 patent does not describe how the mixing of the reactive NMP is to occur other then simply stating that it is accomplished in a crucible.

The NMPs obtained either according to the invention described in Ser. No. 07/902,025, or in a plasma furnace, or by other procedures has a very fine particle size, i.e., in the range of 0.3 to 300 microns. In conventional practice, in order to commercially process these fines in a calcination and/or sintering process, it is necessary to first process the fines through agglomerization prior to treatment as, for example, in a kiln. Such a process is described in U.S. Pat. No. 4,523,949. Attempts to directly process these fines in a kiln leave the fines entrained in the exhaust gas stream. These entrained fines have low residence time within the kiln, burden the exhaust stream and/or are poorly treated. At best, these fines remain fines, i.e., with a minimum quantity of larger aggregates being formed. Fines agglomerization equipment is expensive to operate and maintain, requiring an extra processing step such as briquetting, compacting, granulating or the like. Such agglomerization handling can result in emission of unacceptable fumes into the atmosphere also causing ecological problems.

Fines are generated by refractory, metallurgical, and glass industries and are collected by bag houses and electrostatic precipatators. These fines are often land filled as wastes or agglomerated prior to thermal processing in wet process granulators. These agglomerates generate a high percentage of fines on thermal treatment and much of the agglomerate end up back in the bag house or electrostatic precipatator.

3

Accordingly, there is a need for a process for treating small particle NMP fines and other fines such as electrostatic precipatator (ESP) dusts and bag house dusts in a high temperature atmosphere in order to produce aggregate materials on a continuous basis without having to first agglomerate the fines.

SUMMARY OF INVENTION

The present invention is directed to a process of treating an aluminum dross residue having aluminum nitride and/or free aluminum and/or aluminum chloride and having a particle size within the range of 0.3 to 300 microns, without prior agglomeration, to produce a high alumina, magnesia, or silica lightweight aggregate comprising (a) feeding NMPs fines into the upstream end of a sealed rotatable kiln while the kiln is rotating at between about ⅛ and 1 rpm, (b) heating the NMPs with an external heat source, such as an oxy-fuel burner, within the kiln with less than about 50% of the total heat energy input for heating the NMPs to a temperature between 2000° and 4000° F., (c) feeding oxygen or a mixture of oxygen and water into the upstream end of the kiln in a controlled quantity sufficient to react with the available aluminum nitride, free aluminum and aluminum chloride supplied by the NMPs, thereby providing the additional heat energy necessary to bring the temperature of the NMPs to about 2000° to 4000° F. and (d) recovering a high alumina, magnesia or silica lightweight aggregate at the downstream end of the kiln.

It has been determined that a primary feature of the invention is to have the kiln sealed in order to avoid substantial air entrance to maintain high $O_2$ atmosphere into the kiln and to retain the fine particles within the kiln as well as enhance the reaction rate and equilibrium of aluminum nitride to alumina. It is another primary feature that the kiln be rotated at a low rate in order that the NMP fines are layered into the lower level of the rotating kiln and limit the reaction to the surface of the NMP bed. Thus, the speed of rotation is at most 1 rpm and preferably is in the range of less than about ⅓ rpm. Further, it has been found that the necessary energy for heating the NMPs can be provided by feeding oxygen, or a mixture of oxygen and water, into the sealed kiln on a continuous basis as the NMP fines are feed into the rotating kiln once the reaction is initiated by an external source of heat. The oxygen or oxygen and water reacts with the AlN or free aluminum to release heat energy. Feeding of the oxygen or oxygen and water at a steady and low rate provides the necessary controlled movement of the fines for depositing the NMP particles within the rotating kiln without having the fines disperse throughout the kiln. Accordingly, it is only necessary to provide a small heat source at the entrance of the rotating kiln in order to initially heat and ignite the NMPs as they flow into the kiln. It has been determined that no more than about 50% of the total heat energy for operating the kiln is necessary to be supplied from an external source. Preferably, the heat energy will be less than about 20%. It is important that the heating source be a low flow high temperature heating device to limit gas velocities and not blow fines down the reactor and to generate high surface temperatures to initiate exothermic chemical reactions at active aluminum nitride sites. Another feature of the invention is to control the temperature within the kiln by feeding a variation of reactive and non-reactive NMP as will be hereinafter defined. The present invention provides, therefore, a kiln with highly advantageous processing economies to produce directly light weight alumina aggregates useful in refractory materials.

THE DRAWING AND DETAILED DESCRIPTION OF INVENTION

In the drawings,

FIG. 1 illustrates diagrammatically the overall kiln system of the present invention and its operation; and FIG. 2 is an enlarged partial view, illustrating in section, the firing hood and sealing mechanism on the kiln.

Referring to FIG. 1, bagged NMP which may be "reactive NMP," defined as containing at least 3% AlN, or "treated NMP," also referred to as non-reactive NMP, defined as containing below about 1% AlN, is fed from bin 12 into a vibratory feed 14 which feeds the NMP into a conduit 16 where the NMP is carried into the internal area 18 of kiln 20 by means of oxygen or oxygen and water flow. Non-reactive NMP, as used herein, can be mixtures of alumina dross fines and bag house or ESP dusts from industrial processes. Because the kiln is sealed an oxygen atmosphere is maintained within the kiln. The NMP fines, because of the low oxygen flow, are deposited into the lower level of the kiln as illustrated at 22 without being dispersed throughout the interior of the kiln. A torch such as an oxy-fuel burner 24 is positioned at the entrance end of kiln 20. The NMP after reaction in the kiln flows into a chute 26 at the end of the kiln where it is deposited into a cooler 28 for cooling. After passing through the cooler the NMP is fed into chute 30 into elevator means 32 where it is then fed to a conveyor 34 and to a sizing means 36 having a plurality of screens 38. The NMPs of different particle sizes is feed through chutes 40 into bins 42, 44 and 46. The rotating kiln reactor is positioned on trunions 21. Rotation is provided by bull gear 23 and pinion 25 driven by motor 27. As will be apparent, the oxy-fuel burner 24 can be replaced with any burner capable of introducing oxygen into the environment of the burner, as for example a plasma energy torch where oxygen is introduced through the torch.

As also illustrated in FIG. 1, the exhaust from the sealed kiln 20 passes through conduit 52 into a dust collector 50 and then to a bag house 54 where the solid matter is recovered and the exhaust gas passed into a stack 56 for treatment before being passed into the atmosphere.

As shown in FIG. 2, the kiln has a firing hood 60 which includes means for sealing the kiln. Thus, as shown in FIG. 2, the sealing means comprises shoe means 62 which engage rotor 64 which rotates with kiln 20. The shoe means are of a resilient material such as teflon or carbon permitting the rotor to rotate within the shoes while maintaining a gas-tight seal. The shoe are anchored to a steel structure 70 with toggle means 66 and 68. A flexible high temperature cloth 72 assures a substantially $O_2/H_2O$ atmosphere in the kiln while permitting the kiln to rotate. A similar seal is positioned at the outlet end as shown in FIG. 1. Chute 26 includes a double flapper mechanism 29 to further seal the outlet end of the kiln.

OPERATION OF THE KILN SYSTEM

The operation of the kiln requires the merger of a variety of conditions, including rotational speed of the kiln, rate of NMP feed both reactive and non-reactive, rate of oxygen flow and burner control. Each of these variables will be considered separately.

ROTATION SPEED

Rotation speed controls residence time within the kiln, i.e., the amount of time the reactions have to be completed in the kiln. Also, for any feed rate the rotation speed controls the bed depth. The maximum rotation speed for any feed rate is the rotation speed that gives a kiln bed depth of at least 20%. The kiln cannot tolerate bed depths less than about 20%. From the standpoint of kiln stability and consistent product quality, the bed depth should be controlled at above about 30%, but no greater than about 60%. The drum speed must be controlled to accomplish bed depth. A rotational speed of from about ⅛ to 1 rpm is the desired range.

OXYGEN FLOW

To convert the reactive NMPs in the feed to alumina, oxygen is required. To obtain complete reaction of the reactants, excess oxygen is used. Typical feed rates are as follows:

| REACTIVE FEED RATE | $O_2$ FEED, SCFM |
|---|---|
| 1.5 T*/HR | 8,000 |
| 2.0 T/HR | 10,600 |
| 3.0 T/HR | 16,000 |
| 4.0 T/HR | 21,500 |
| 5.0 T/HR | 26,666 |

*T = Tons

If the feed rate is interrupted the drum speed is slowed to a minimum and argon flow is established through the $O_2$ inlet to form a non-reactive environment. These low gas feed rates are used to deposit the fines in the kiln, and being low, allow for the feeding of the fines to the lower level of the kiln without dispersal throughout the kiln.

BURNER USE

An external source of heat energy, such as a oxy-fuel burner, is used for start-up and for cleaning the kiln of build-up. An oxy-fuel burner is normally set at a minimum flow of about 350 SCFM ($CH_4$) and 700 SCFM ($O_2$). The maximum fire setting is not normally used with reactive material in zone 1, zone 2 or 3 as hereinafter defined, i.e., with reactive material in the first half of the kiln. Under normal conditions with normal reactive material feeds the burner is set at the minimum flow setting of 350 SCFM ($CH_4$) and 700 SCFM ($O_2$).

TEMPERATURES EACH ZONE

There are a plurality of temperature zones in the kiln, for example, zones 0-1, 1-2, 2-3, 3-4, 4-5, 5-6, 6-7 as illustrated in FIG. 1. A pen recorder and temperature indicators are set to read temperatures at five (5) points, usually the first five points.

WATER USE

Water is preferably used as a catalyst for the reaction of active NMPs and oxygen and can be used to initiate high reaction at low temperatures. The water is not consumed.

DESIRED KILN OPERATING SPECIFICATIONS

The following conditions are illustrated and utilize an operating spillover screw within the kiln and assume the use of no water.

| | |
|---|---|
| DRUM SPEED | 1/3 RPM |
| FEED RATE | 2.0 T/HR |
| % DRUM FULL | 50 |
| RESIDENCE TIME | 8.3 HOURS |
| TC* 1 | 1300 |
| TC 2 | 1300 |
| TC 3 | 2600 |
| TC 4 | 2300 |
| TC 5 | 2000 |
| $O_2$ FLOW | 10,600 |
| FEED | Al |
| BAGHOUSE | 0–4% |
| BURNER** | |
| $CH_4$ | 350 SCFM |
| $O_2$ | 700 SCFM |

INCREASED OPERATING RATE
Assume $H_2O$ being used

| | |
|---|---|
| DRUM SPEED | 2/3 RPM |
| FEED RATE | 4 T/HR |
| % DRUM FULL | 50 |
| RESIDENCE TIME | 4.2 HOURS |
| TC 1 | 1200 |
| TC 2 | 1300 |
| TC 3 | 2600 |
| TC 4 | 2600 |
| TC 5 | 2300 |
| $O_2$ FLOW | 21,200 |
| FEED | Al |
| BAGHOUSE | 0–4% |
| $H_2O$ | .25 GPM |
| BURNER | |
| $CH_4$ | 350 SCFM |
| $O_2$ | 700 SCFM |

*TC = Temperature Zone
**1.0 Megawatt

The primary temperature control for operating the kiln as above defined is the feedstock Al and AlN content and resultant total fuel value. If temperatures exceed desired control points then more inert or non-reactive feed can be used. Conversely, if temperatures are too low, more reactive feed can be used. Secondarily, temperature control can be achieved by stopping $O_2$ flow and establishing argon flow.

The first zone TC#1 located about 6' down the kiln should be kept at less than about 1600° F. at normal operation. The second zone TC#2 located 15' down the kiln should be kept at less than about 1600° under normal operation. If TC#1 or #2 exceed 1600° F. respectively, inert or non-reactive feed should be established. If inert feed cannot be established, the $O_2$ low can be discontinued and argon flow commenced until the correct temperature limits are reached. Similarly, if any of the other temperature zones exceed 2600° F., the $O_2$ flow can be discontinued and argon flow commenced until the correct temperature limits are reached. In all zones except 1 and 2, the thermocouple readings will become less sensitive over time. Highly insulative coatings can form on the kiln which will desensitize thermocouple readings. These coatings can be periodically removed by firing the oxy-fuel burner at maximum capacity while feeding only non-reactive NMP.

When running a deep bed in the kiln and the reaction is confined to the surface of the bed the actual surface material is 600° to 1500° F., or hotter than the measured TC's in the kiln. Different conditions are shown in Table 1.

TABLE 1

| FEED RATE | RES. TIME RPM/RES. TIME ⅓ 4.6 + 3.8* % FULL | % FULL RPM/RES. TIME ½ 3.0 + 2.5 % FULL | FEED RATE RPM/RES. TIME ⅔ 2.3 + 1.9 % FULL | RPM/RES. TIME 1 1.5 + 1.3 % FULL |
|---|---|---|---|---|
| 1.5 T/HR | 39.7/22.8 | 26/15.2 | 19/11.4 | 13/7.5 |
| 2.0 T/HR | 52.9/30.4 | 34.7/20.2 | 25.3/15.2 | 17.3/10 |
| 2.5 T/HR |  | 43.2/25.2 | 31.5/18.9 | 21.6/12.4 |
| 3.0 T/HR |  | 52/30.4 | 38/22.8 | 26/15 |
| 3.5 T/HR |  |  | 44/26.6 | 30/17.4 |
| 4.0 T/HR |  |  | 50.6/30.4 | 34.6/20 |
| 4.5 T/HR |  |  |  | 39/22.5 |
| 5.0 T/HR |  |  |  | 43.3/25 |

*The first reading, i.e., 4.6, is the time in the 3.3 ft. dia length and the second reading, i.e., 3.8, is the time in the 4.0 ft. dia length.

The most important of the operating conditions are
1) Feed must be continuous.
2) If feed is interrupted then kiln to be slowed to minimum speed.
3) If zone 1 temperature rises above 1600° F., then alternate feed from reactive NMP to non-reactive NMP.
4) At ½ rpm keep feed to 1.5 T/hr. If the feed is at a lower rate, kiln will be less stable and the kiln must be slowed down to keep high bed level—example 1 T/hr=⅓ rpm, and
5) The burner is not to be fired more than medium fire for more than 15 minutes, and is not to be fired above minimum fire unless non-reactive NMP is feed 2 hours prior to mid fire and unless non-reactive NMP is feed 45 minutes after mid fire.

As will be apparent, the above conditions are for a kiln of given length, i.e., about 70 feet and given internal diameter of 3.3 for the first 35 feet and 4.0 for the last 35 feet. The kiln as illustrated will have a slope of ¼ inch per foot. These conditions will be adjusted for other kiln length, kiln diameter, and kiln slope.

Typical data based on one ton of NMP having varying reactive aluminum nitride, free aluminum and chloride are as follows:

EXAMPLE 1

FLOW PER TON NMP (Based on Cl content of 0.5%; 5% Al; 18% AlN; about 1% Water Content)

| INLET GAS FLOWS: | | | OUTLET GAS FLOW: | | HEAT CONTENT |
|---|---|---|---|---|---|
| INJECT: | $O_2$: | 105 SCFM | $O_2$ EXCESS: | 49.2 | PER TON OF |
| BURNER: | $O_2$: | 6.80 SCFM | $N_2$: | 26.0 | NMP FEED = |
| (60 KM) | $CH_4$ | 3.40 SCFM | $NO_x$: | .20 | 1156 KW/HR |
| TOTAL: | | 115.20 SCFM IN | CO: | .04 | BURNER = 60 |
| | | | $SO_2$: | .003 | KW/HR |
| | | | $H_2O$: | 12.8 | |
| | | | $CO_2$: | 3.4 | |
| | | | HCl: | 1.66 | |
| | | | | 92.13 SCFM OUT | |

*Cl and HCl will change proportionally

EXAMPLE 2

FLOW PER 1.5 TON (1 ton reactive and 0.5 ton non-reactive NMP)
(The reactive NMP is based on Cl content of 3.5% Cl; 10% Al approx.; 1% $H_2O$; 15% AlN; about 1% water content)

| INLET GAS FLOWS: | | | OUTLET GAS FLOW: | | HEAT CONTENT |
|---|---|---|---|---|---|
| INJECT: | $O_2$: | 105 SCFM | $O_2$ EXCESS: | 39.0 | PER TON = |
| BURNER: | $O_2$: | 6.80 SCFM | $N_2$: | 21.0 | 1630 KW/HR |
| (60 KM) | $CH_4$ | 3.40 SCFM | $NO_x$: | .25 | REACTIVE |
| TOTAL: | | 115.20 SCFM IN | CO: | .05 | NMP FEED |
| | | | $SO_2$: | .001 | BURNER = |
| | | | $H_2O$: | 4.1 | 60 KW |
| | | | $CO_2$: | 3.4 | |
| | | | HCl: | 11.62 | |
| | | | | 79.42 SCFM OUT | |

*Cl and HCl will change proportionally

The aforesaid examples and conditions with respect to the operation of the kiln is for the kiln as specified and, as will be known to one skilled in the art, changing of the nature of the kiln, including size will affect the processing conditions which must be varied accordingly.

The present invention provides a unique means for processing NMPs without prior agglomerization, substantial lowering of cost of operation and improving operational efficiency. Thus, NMPs of fine particle size can be processed using a minimum of added heat energy with most of the heat energy for processing of the NMPs coming from reaction within the kiln. Thus, after start up, essentially no external heat energy requirement is necessary. Since the system is a closed system, it is possible to control the reaction rate by the feed of processing oxygen and/or oxygen and water. It is also possible to control the nature of the operation of the kiln by controlling the input of NMPs into the closed kiln.

As will be apparent to one skilled in the art, various modifications can be made to the kiln and operating conditions within the scope of the aforesaid description. Such modification being within the ability of one skilled in the art form a part of the present invention and are embraced by the appended claims.

It is claimed:

1. Process of treating an aluminum dross residue having available aluminum nitride and/or free aluminum and/or aluminum chloride and having a particle size within the range of 0.3 to 300 microns to produce a high alumina lightweight aggregate comprising
   (a) feeding said residue into the upstream end of a sealed rotatable kiln while said kiln is rotating at between about ⅛ and 1 rpm,
   (b) heating said residue within said kiln with less than about 50% of the total heat energy input for heating said residue to a temperature between 2000° and 4000° F.,
   (c) feeding oxygen or a mixture of oxygen and water into the upstream end of said kiln in a controlled quantity sufficient to react with said available aluminum nitride, free aluminum and aluminum chloride, thereby providing the heat energy necessary to bring the temperature of said residue to about 2000° to 4000° F. and
   (d) recovering a high alumina lightweight aggregate at the downstream end of said kiln.

2. Process of producing a high alumina lightweight aggregate comprising
   (a) feeding an aluminum dross residue having available aluminum nitride and/or free aluminum and/or aluminum chloride and having a particle size within the range of 0.3 to 250 microns into the upstream end of a sealed rotatable kiln while said kiln is rotating,
   (b) heating said residue within said kiln with less than about 50% of the total heat energy input for heating said residue to a temperature between 2000° and 4000° F.,
   (c) feeding oxygen or a mixture of oxygen and water into the upstream end of said kiln in a controlled quantity sufficient to react with said available aluminum nitride, free aluminum and aluminum chloride, thereby providing the heat energy necessary to bring the temperature of said residue to about 2000° to 4000° F. and
   (d) recovering a high alumina lightweight aggregate at the downstream end of said kiln.

3. Process of treating an aluminum dross residue having available aluminum nitride and/or free aluminum and/or aluminum chloride and having a particle size less than 300 microns to produce a high alumina aggregate comprising
   (a) feeding said residue into the upstream end of a sealed rotatable kiln while said kiln is rotating below about 1 rpm,
   (b) heating said residue within said kiln with less than about 50% of the total heat energy input for heating said residue to a temperature between 2000° and 4000° F.,
   (c) feeding oxygen or a mixture of oxygen and water into the upstream end of said kiln in a controlled quantity sufficient to react with said available aluminum nitride, free aluminum and aluminum chloride, thereby providing the heat energy necessary to bring the temperature of said residue to about 2000° to 4000° F. and
   (d) recovering a high alumina aggregate at the downstream end of said kiln.

4. The process of claim 3 wherein an additional refractory material is fed into the kiln along with said dross residue.

5. The process of claim 4 wherein said additional refractory material is an oxide of magnesium, aluminum, silicon, calcium, nickel, titanium or mixtures thereof.

6. The process of claim 3 wherein the total gas flow within the kiln is less than about 200 SCFM based on a 4 ft. diameter kiln.

7. The process of claim 6 wherein the residue flow into said kiln is controlled with said total gas flow.

8. The process of claim 6 wherein non-reactive NMPs are fed to the kiln for partial temperature control.

9. The process of claim 3 wherein the bed depth within the kiln is at least 25% and not more than about 60%.

10. The process of claim 9 wherein said bed depth is maintained at about 40% of said kiln.

* * * * *